United States Patent
Michielin et al.

(10) Patent No.: US 12,423,836 B2
(45) Date of Patent: Sep. 23, 2025

(54) CAMERA-RADAR FUSION USING CORRESPONDENCES

(71) Applicant: Sony Group Corporation, Tokyo (JP)

(72) Inventors: Francesco Michielin, Stuttgart (DE); Oliver Vogel, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/125,739

(22) Filed: Mar. 24, 2023

(65) Prior Publication Data

US 2023/0316546 A1 Oct. 5, 2023

(30) Foreign Application Priority Data

Mar. 31, 2022 (EP) .................................. 22166015

(51) Int. Cl.
*G06T 7/246* (2017.01)
*G06T 7/10* (2017.01)
*G08G 1/16* (2006.01)

(52) U.S. Cl.
CPC ............ *G06T 7/248* (2017.01); *G06T 7/10* (2017.01); *G08G 1/16* (2013.01); *G06T 2207/10028* (2013.01); *G06T 2207/20021* (2013.01); *G06T 2207/20221* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 10,593,042 | B1* | 3/2020 | Douillard | G06V 20/64 |
| 2019/0337451 | A1* | 11/2019 | Bacchus | B60K 35/28 |
| 2019/0353775 | A1* | 11/2019 | Kirsch | G01S 7/4004 |
| 2020/0175315 | A1* | 6/2020 | Gowaikar | G01S 7/417 |
| 2020/0180638 | A1* | 6/2020 | Kanoh | B60W 30/095 |
| 2020/0219264 | A1* | 7/2020 | Brunner | G01S 7/4808 |
| 2021/0033722 | A1* | 2/2021 | Søndergaard | G01S 13/89 |
| 2021/0048521 | A1* | 2/2021 | Leduc | G01S 13/75 |
| 2021/0209785 | A1* | 7/2021 | Unnikrishnan | G01S 7/41 |
| 2022/0130109 | A1* | 4/2022 | Arbabian | G01S 13/867 |
| 2022/0153306 | A1* | 5/2022 | Imran | G06F 18/22 |
| 2022/0262129 | A1* | 8/2022 | Cao | G01S 13/931 |

(Continued)

FOREIGN PATENT DOCUMENTS

| | | |
|---|---|---|
| CN | 108847026 A | 11/2018 |
| CN | 111652914 A | 9/2020 |

OTHER PUBLICATIONS

Feng et al., "Deep Multi-modal Object Detection and Semantic Segmentation for Autonomous Driving: Datasets, Methods, and Challenges", arXiv:1902.07830v4 [cs.RO], Feb. 8, 2020, pp. 1-27.

(Continued)

*Primary Examiner* — Daniel T Tekle
(74) *Attorney, Agent, or Firm* — XSENSUS LLP

(57) ABSTRACT

A method of performing sensor fusion of data obtained from a camera (51) and a supplemental sensor (52), the method comprising performing patch tracking (55) on image data (53) provided by the camera (51) to determine tracked patches (56), and performing a fusion (57) of the image data (53) obtained from the camera (51) with supplemental data (54) provided by the supplemental sensor (52) based on the tracked patches (56).

15 Claims, 11 Drawing Sheets

(56) References Cited

U.S. PATENT DOCUMENTS

2022/0377242 A1* 11/2022 Camacho ............... H04N 23/61
2023/0176205 A1* 6/2023 Yu .......................... G01S 13/72
                                                                    348/143
2023/0316546 A1* 10/2023 Michielin ................ G06T 7/10
                                                                    348/148

OTHER PUBLICATIONS

Lim et al., "Radar and Camera Early Fusion for Vehicle Detection in Advanced Driver Assistance Systems", Machine Learning for Autonomous Driving Workshop at the 33rd Conference on Neural Information Processing Systems (NeurIPS 2019), pp. 1-11.

Chang et al., "Spatial Attention Fusion for Obstacle Detection Using MmWave Radar and Vision Sensor", Sensors, vol. 20, No. 4, Available Online At: https://doi.org/10.3390/s20040956, Feb. 11, 2020, pp. 1-21.

Nobis et al., "A Deep Learning-based Radar and Camera Sensor Fusion Architecture for Object Detection", arXiv:2005.07431v1 [cs.CV], May 15, 2020, 7 pages.

Jedoui et al., "Lecture 18: Tracking", Computer Vision: Foundations and Applications (CS 131, 2017), Available Online At: http://vision.stanford.edu/teaching/cs131_fall1718/files/18_notes.pdf, 2017, pp. 1-6.

Molton et al., "Locally Planar Patch Features for Real-Time Structure from Motion", In Proc. British Machine Vision Conference, Available Online At: http://citeseerx.ist.psu.edu/viewdoc/summary?doi=10.1.1.422.1885, 2004, 10 pages.

* cited by examiner

| Quantity | Camera | Radar |
|---|---|---|
| Angular Position | very good | not so good |
| Radial Distance | not so good | good |
| Radial Speed | no | very good |

Fig. 8a

| Quantity | Camera with affine correspondences | Radar |
|---|---|---|
| Angular Position | very good | not so good |
| Radial Distance | not so good | good |
| Radial Speed | no | very good |
| Scale Ratio/TTC | good | implicitly |
| Surface Normal | good | no |

Fig. 8b

CAMERA-RADAR FUSION USING CORRESPONDENCES

CROSS-REFERENCE TO RELATED APPLICATION

This application claims priority to European Application No. 22166015.2, filed Mar. 31, 2022, the entire contents of which are incorporated herein by reference.

TECHNICAL FIELD

The present disclosure generally pertains to the field of processing sensor data.

TECHNICAL BACKGROUND

In automotive, driver assistance systems (ADAS) are emerging for various applications. One major such application is obstacle detection for preventing collisions.

Teck-Yian Lim et al in "Radar and Camera Early Fusion for Vehicle Detection in Advanced Driver Assistance Systems", 2019, describe a Perception module of a modern Advanced Driver Assistance Systems (ADAS).

Chang, et al in "Spatial Attention Fusion for Obstacle Detection Using MmWave Radar and Vision Sensor", Sensors 2020, 20, 956. https://doi.org/10.3390/s20040956 describe a spatial attention fusion (SAF) method for obstacle detection using mmWave radar and vision sensor.

Felix Nobis et al in "A Deep Learning-based Radar and Camera Sensor, Fusion Architecture for Object Detection", arXiv:2005.07431, describe an enhancement of current 2D object detection networks by fusing camera data and projected sparse radar data in the network layers.

Cars are commonly equipped with sensors such as cameras and radars. Different sensors, however, have different strengths and weaknesses. Monocular cameras, for instance, excel at measuring angular position, however they have no inherent capability of measuring distances. On the other hand, radar excels at measuring radial velocity and distance, quantities that cameras cannot measure. Radar, however, performs poorly at measuring angular position. Often radar can estimate horizontal angles to some degree—albeit not as good as cameras—while the accuracy for vertical angles is not good or it may even be not possible such angles at all.

From that perspective, systems try to fuse information from both sensors, trying to combine the strengths of either sensor. This concept is known as sensor fusion.

It is generally desirable to provide better techniques for sensor fusion.

SUMMARY

According to a first aspect the disclosure provides a method of performing sensor fusion of data obtained from a camera and a supplemental sensor, the method comprising performing patch tracking on image data provided by the camera to determine tracked patches, and performing a fusion of the image data obtained from the camera with supplemental data provided by the supplemental sensor based on the tracked patches.

According to a further aspect the disclosure provides a device comprising circuitry, the circuitry being configured to execute instructions, the instructions, when executed on the circuitry, performing patch tracking on image data provided by a camera to determine tracked patches, and a fusion of the image data obtained from the camera with supplemental data provided by a supplemental sensor based on the tracked patches.

Further aspects are set forth in the dependent claims, the following description and the drawings.

BRIEF DESCRIPTION OF THE DRAWINGS

Embodiments are explained by way of example with respect to the accompanying drawings, in which:

FIG. 8a provides a table in which the performance of a camera is compared to the performance of radar;

FIG. 8b provides a table in which the performance of a camera that exploits affine correspondences is compared to the performance of radar;

DETAILED DESCRIPTION OF EMBODIMENTS

Figure 1:
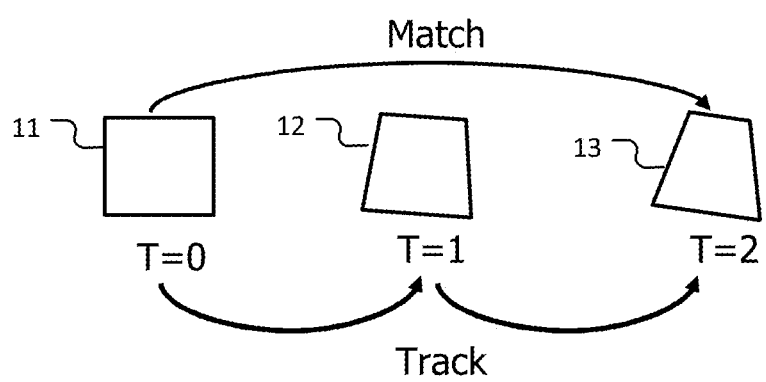
FIG. 1 provides a schematic representation of affine patch tracking and matching.

Before a detailed description of the embodiments under reference of FIG. 1, general explanations are made.

Camera and radar-based systems operate in very different domains: cameras on pixels in images, radar typically on sparse point clouds in the world. The embodiments described below in more detail relate to systems and processes for sensor fusion, and in particular to the fusion of information from camera and radar. The embodiments combine the advantages of both sensor types.

The embodiments described below provide a natural domain in which radar and camera data can be fused. That is, despite that cameras and radar operate in different domains, the embodiments allow a conversion between the domains and they avoid ambiguities which can deteriorate the fusion result. In particular, by applying the technology of the embodiments, inherent ambiguities of sensor fusion are resolved, such as not knowing the distance when transforming image data to the world, and ambiguities in the location in the image when transforming radar data to the image are avoided.

The embodiments described below in more detail disclose a method of performing sensor fusion of data obtained from a camera and a supplemental sensor, the method comprising performing patch tracking on image data provided by the camera to determine tracked patches, and performing a fusion of the image data obtained from the camera with supplemental data provided by the supplemental sensor based on the tracked patches.

Sensor fusion may comprise any process of combining sensor data or data derived from separate sources such that the resulting information has less uncertainty than would be possible when these sources were used individually.

Performing patch tracking may comprises performing an affine patch tracking.

Affine patch tracking is based on the principle of affine transformation which in general describes an automorphism of an affine space (Euclidean spaces are specific affine spaces). An affine transformation may for example be a function which maps an affine space onto itself while preserving both the dimension of any affine subspaces (meaning that it sends points to points, lines to lines, planes to planes, and so on) and the ratios of the lengths of parallel line segments.

The method may comprise determining, for a patch of the tracked patches, a scale ratio. The scale ration may for example be a patch scale ration.

The method may comprise determining, for a part of the supplemental data provided by the supplemental sensor, an equivalent scale ratio.

The method may comprise identifying, for a part of the supplemental data provided by the supplemental sensor, a corresponding patch using a scale ratio of the patch and an equivalent scale ratio related to the supplemental data provided by the supplemental sensor.

The method may comprise applying part of the supplemental data provided by the supplemental sensor to a patch of the tracked patches.

The supplemental data may for example be provided by the supplemental sensor in the form of a point cloud.

The part of the supplemental data may be a point of a point cloud.

According to some embodiments, the supplemental sensor is a radar device. According to other embodiments, the supplemental sensor may be a Lidar device or a Time of Flight device.

The equivalent scale ratio may for example be determined from distance information and radial velocity information of a point of a radar point cloud.

The method may further comprise, for a point that is considered being located close to a patch of the tracked patches, comparing an equivalent scale ratio of the point with a scale ratio of the patch obtained from affine patch tracking to determine, if the scale ratios match.

The method may further comprise discarding those points of points that are considered being located close to a patch of the tracked patches, whose equivalent scale ratios do not match with a scale ratio of the patch obtained from affine patch tracking.

The method may further comprise performing object segmentation on the image data captured by the camera.

The method may further comprise averaging supplemental data related to patches associated with an object, and associating the averaged information with the object.

The supplemental data may comprise Time to Collision information.

The sensor fusion is applied in an automotive context.

The embodiments also disclose a device comprising circuitry, the circuitry being configured to execute instructions, the instructions, when executed on the circuitry, performing patch tracking on image data provided by a camera to determine tracked patches, and a fusion of the image data obtained from the camera with supplemental data provided by a supplemental sensor based on the tracked patches.

Circuitry may include a processor, a memory (RAM, ROM or the like), a storage, input means (mouse, keyboard, camera, etc.), output means (display (e.g. liquid crystal, (organic) light emitting diode, etc.), loudspeakers, etc., a (wireless) interface, etc., as it is generally known for electronic devices (computers, smartphones, etc.). Moreover, circuitry may include sensors for sensing still image or video image data (image sensor, camera sensor, video sensor, etc.), etc.

The embodiments also disclose a system comprising a camera, a supplemental sensor, and a device, the device being configured to perform patch tracking on image data provided by the camera to determine tracked patches, and to perform a fusion of the image data obtained from the camera with supplemental data provided by the supplemental sensor based on the tracked patches.

The embodiments also disclose a computer-implemented method comprising performing sensor fusion of data obtained from a camera and a supplemental sensor, the method comprising performing patch tracking on image data provided by the camera to determine tracked patches, and performing a fusion of the image data obtained from the camera with supplemental data provided by the supplemental sensor based on the tracked patches. The computer-implemented method may comprise instructions, which, when executed on a processor, perform the processing steps described in the embodiments.

The embodiments also disclose a machine-readable recording medium comprising instructions, which, when executed on a processor, perform the processing steps described in the embodiments.

Affine Patch Tracking

The embodiments described below in more detail make use of the additional information provided by affine correspondences to provide a good domain for fusion camera and radar data. This allows for an efficient and robust way of fusing camera and radar measurements, which can be easily integrated in existing systems based on tracking affine correspondences.

In the case of affine correspondences, these features are not merely pixels but patches in the image. This gives major advantages over tracking pixels in terms of robustness. Affine correspondences are frequently used in Simultaneous Localization and Mapping (SLAM) systems, but also in other object tracking systems.

Affine patch tracking has essentially two aspects: The first aspect consists in the identification of an appropriate set of 2D (spatial) patches in image data to represent each surface in a scene.

Figure 5:
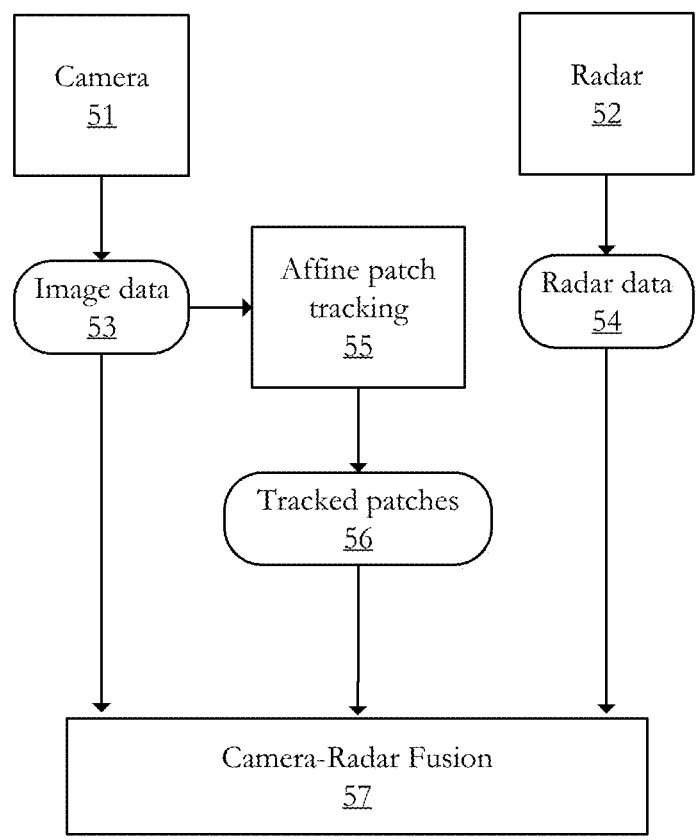
FIG. 5 shows an example of a system for camera-radar fusion using affine correspondences.

The second aspect consists in the tracking of the patches through the image sequence (see 53 in FIG. 5) provided by a camera (see 51 in FIG. 5).

These techniques are well known to the skilled person. At a first step, points (or features or patches) are located in the images. These correspond to points where there is structure. By solving the flow (optical, affine, . . . ) equations, the flow on these points is estimated.

An overview of suitable techniques for object tracking and its affine extension is given by Khaled Jedoui in "Lecture 18: Tracking" (http://vision.stanford.edu/teaching/cs131_fall1718/files/18_notes.pdf).

Identifying the 2D patches may for example be based on identifying distinct surfaces in an image. Each 2D patch may for example relate to a rectangular region in a first frame of an image sequence.

The tracking of the 2D patches and estimation of their associated affine motion parameters may for example be achieved using weighted linear regression over an estimated optical flow field.

In addition to affine parametrization, a complete projective parametrization may be applied, which results in a complete homography.

For example, the technique described by Molton et al in "Locally Planar Patch Features for Real-Time Structure from Motion", 2004, In Proc. British Machine Vision Conf, (http://citeseerx.ist.psu.edu/viewdoc/summary-?doi=10.1.1.422.1885) may be applied. FIG. 1 provides a schematic representation of affine patch tracking and matching. A rectangular 2D patch 11 is identified in a first frame (T=0) of an image sequence. By tracking, a corresponding 2D patch 12 is identified in a second frame (T=1) of the image sequence, image sequence. Still further, by tracking, a corresponding 2D patch 13 is identified in a third frame (T=2) of the image sequence. Due to motion of the camera or objects, 2D patches 12 and 13 that correspond to patch 11 are no longer rectangular, but have a shape that relates to the shape of patch 11 by affine transformation. By affine transformations geometric transformation such as lines and parallelism are preserved, but not necessarily distances and angles. By tracking 2D patches in the image sequence over time, 2D patches identified at distinct times in the image sequence are matched to each other.

Using technology such as affine SLAM, rectangular patches that are identified and tracked in the 2D image sequence can be tracked in 3D. That is, each 2D patch can be related to a 3D patch and 3D information such as 3D position of the points defining the patch and a surface normal may be attributed to each patch.

As described above, affine patch tracking gives additional information on the features identified in an image sequence provided by a camera. It becomes possible to estimate a surface normal for the feature in world coordinates.

Figure 2:
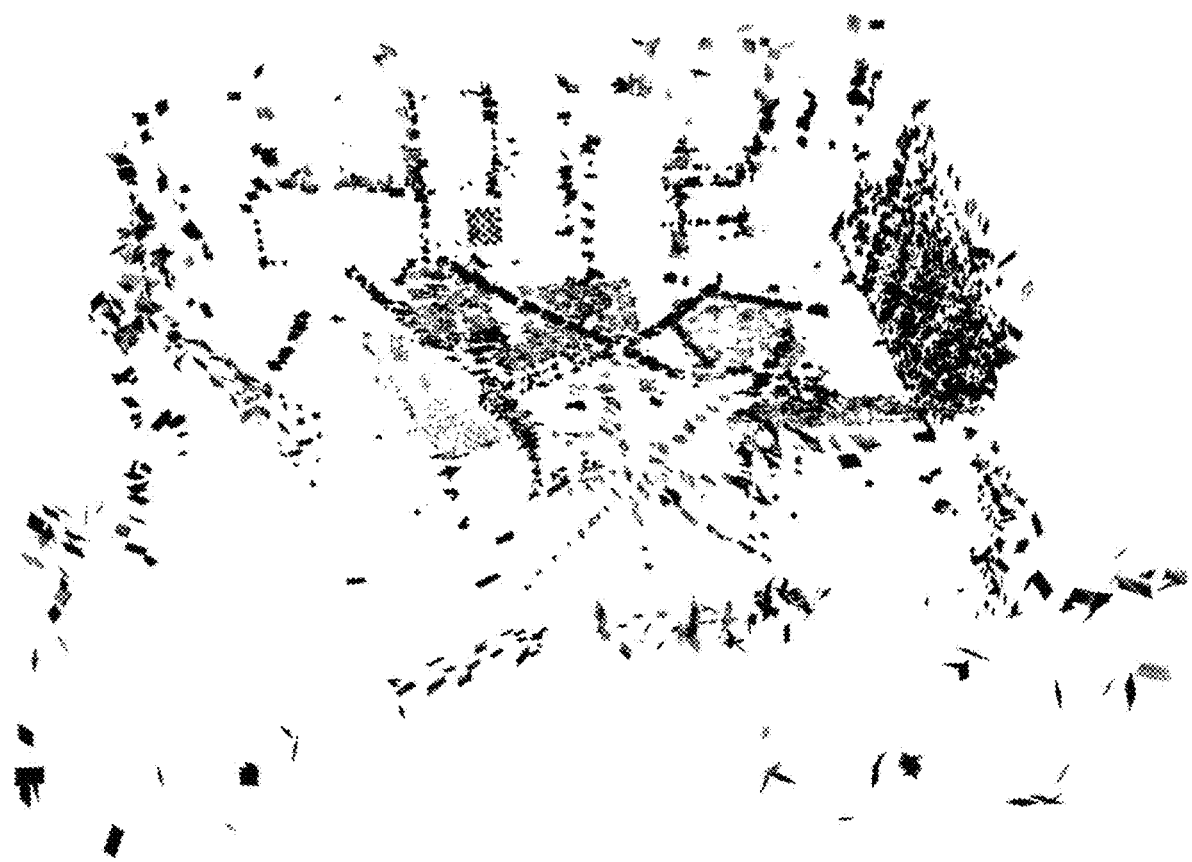
FIG. 2 provides a schematic example of a set of patches obtained by affine patch tracking performed on an image sequence of a scene.

FIG. 2 provides a schematic example of a set of patches obtained by affine patch tracking performed on an image sequence of a scene.

Patch Scale Ratio (Camera)

As affine patch tracking gives additional information on the features identified in an image sequence provided by a camera, it becomes possible to estimate a size change of the patch between two frames (called here, the "scale ratio").

This scale ratio does not give a direct indication of the scale, i.e., the distance of the feature from the camera, but it provides indication on how quickly a feature in the image sequence is approaching the camera (time to contact) or moving away from the camera (e.g., the time it takes until the distance doubles), relative to its (unknown) distance.

This scale ratio is a quantity that is used for the fusion of sensor data in the sensor fusion described in the embodiments below in more detail.

The scale ratio may be determined by comparing the dimensions of two 3D patched that have been matched by affine patch tracking. For example, a scale ratio may be determined from the distance of two matching points of a tracked patch over time in camera coordinates.

Figure 3:
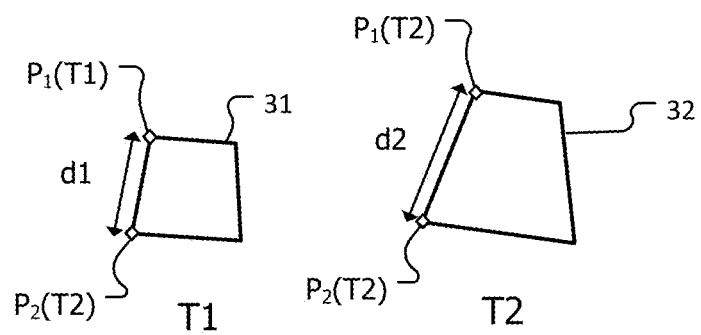
FIG. 3 provides a schematic example of determining the scale ratio for a patch.

FIG. 3 provides a schematic example of determining the scale ratio for a patch. Affine patch tracking provides a 3D patch 31 at time T1, and a matching 3D patch 32 at time T2. Affine patch tracking provides matching points $P_1$ and $P_2$ of patches 31 and 32. A distance d1 between points $P_1$ and $P_2$ at time T1 is obtained from their positions $P_1$ (T1) and, respectively, $P_2$ (T1) at time T1 in world coordinates. A distance d2 between points $P_1$ and $P_2$ at time T2 is obtained from their positions $P_1(T2)$ and, respectively, $P_2(T2)$ at time T2 in world coordinates. A scale ratio can be determined from the affine patch tracking by relating, for example, the distance d1 at time T1 to the distance d2 at time T2, according to:

$$SR_{affine} = \frac{d2}{d1} \qquad \text{Eq. (1)}$$

In the embodiment described above, a scale ratio results from the distance of two matching points of a tracked patch over time. The embodiments are, however, not limited to determining the scale ratio from two points. Any geometric feature that represents the scale of a patch can be used to determine the scale ratio, for example distances between multiple points of a patch, a surface of the patch, or the like.

The determination of the scale ratio according to the example above assumes that there is no rotation or that there is the same scale on all the sides of the patches. A more general description is the following:

An affine patch change can be represent by an homography matrix $$H = \begin{bmatrix} h_{11} & h_{12} & h_{13} \\ h_{21} & h_{22} & h_{23} \\ h_{31} & h_{32} & h_{33} \end{bmatrix} \qquad \text{Eq. (2)}$$

An area ratio AR, i.e. the change in the patch area in the image, is given by the determinant of the upper left sub matrix $$AR = \left\| \begin{bmatrix} h_{11} & h_{12} \\ h_{21} & h_{22} \end{bmatrix} \right\| = h_{11} \cdot h_{22} - h_{12} \cdot h_{21} \qquad \text{Eq. (3)}$$

A scale ratio $SR_{affine}$ may be obtained directly from this area ratio AR:

$$SR_{affine} = AR \qquad \text{Eq. (4).}$$

Alternatively, a scale ratio may be obtained by taking the square root of the area ratio $$SR_{affine} = \sqrt{AR}. \qquad \text{Eq. (5).}$$

Equivalent Scale Ratio (Radar)

Assuming an exemplifying case in which a radar device provides its data in the form of a point cloud, where each point of the point cloud has a distance z (relative to the camera plane), and a radial velocity v, where positive is away from a camera used for (extrinsic) calibration (If the relative position and orientation of the radar and camera to each other are known, the position of a point in the radar point cloud can be determined relative to the camera, i.e. in "camera coordinates")

Assuming that z1 and z2 are the distances (relative to the camera plane) of a point p in the world in two subsequent frames, and point p has radial velocity v, and dt is the time between the frames, then:

$$z1 = z2 - v \cdot dt \qquad \text{Eq. (6)}$$

The scale of a feature in an image of the scene is inversely proportional to its distance z, therefore a scale ratio $SR_{equiv}$ from frame 1 to frame 2 can be obtained from radar measurements z1, z2 and v according to:

$$SR_{equiv} = \frac{\frac{1}{z2}}{\frac{1}{z1}} = \frac{z1}{z2} = \frac{z2 - v \cdot dt}{z2} = 1 - dt \cdot \frac{v}{z2} \qquad \text{Eq. (7)}$$

Since scale ratios are computed from previous frames the derivation is done in terms of z2, not z1.

By matching the scale ratios $SR_{affine}$ of patches obtained by affine patch tracking with equivalent scale ratios $SR_{equiv}$ of the points obtained from radar data, information obtained from radar can be associated with corresponding patches identified by affine patch tracking. In this way, for example radial velocity information, or any other information derived from radial velocity information may be attributed to patches.

Figure 4:
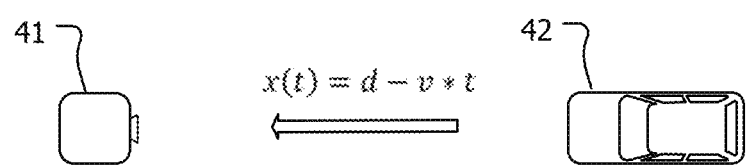
FIG. 4 shows an example of determining a Time to Collision from radar data.

FIG. 4 shows an example of determining a Time to Collision from radar data. At time t, a vehicle 42 is located a distance d away from a camera 41. The vehicle 42 approaches the camera 41 with radial velocity v. A Time to Collision TTC is obtained from distance d and velocity v according to:

$$TTC = d/v \qquad \text{Eq. (8)}$$

The Time to Collision is related to the scale ratio by:

$$TTC^{-1} = v/x(t) = \partial \text{LOG}(x(t))\partial t \qquad \text{Eq. (9)}$$

$$TTC^{-1} = (SR-1) \cdot fps \qquad \text{Eq. (10)}$$

where fps is the number of frames per second of an image sequence provided by a camera.

Camera-Radar Fusion Using Affine Correspondences

Using affine correspondences, the embodiments described here provide a suitable domain for fusing data from both sensor types, camera and radar. In particular, the embodiments provide a well-defined common domain for camera and radar systems in which camera and radar data can be fused.

FIG. 5 shows an example of a system for camera-radar fusion using affine correspondences. A camera 51 produces image data 53. This camera 51 may for example be part of a imaging section of a vehicle (7410 in FIG. 9). This image data 53 provided by camera 51 typically comprises a sequence of images obtained from a scene. The image data 53 is processed by affine patch tracking 55 to identify and track patches in the image data 53. Based on this process, affine patch tracking 55 generates tracked patches 56. A radar device 52 produces radar data 54. This radar device 52 may for example be part of an outside-vehicle information detecting section (7420 in FIG. 9). A camera-radar fusion 57 receives the image data 53 from the camera 51, the tracked patches 56 from the affine patch tracking 55, and the radar data 54 from the radar 52, and performs sensor fusion of the image data 53 and the radar data 54 based on information from the tracked patches 56. This camera-radar fusion 57 is described in more detail below with regard to FIG. 6.

In the embodiment of FIG. 5, a radar device is shown as a supplemental sensor 52 that provides supplemental data 54 for sensor fusion 57. The supplemental data 54 provided by the supplemental sensor 52 is accordingly denoted as radar data, and the sensor fusion 57 is accordingly denoted as camera-radar fusion.

The supplemental data may for example take the form of a point cloud. In the embodiments described below in more detail, a radar point cloud is described as an example of supplemental data. The supplemental data may, however, take other form than a point cloud (for example using pre-aggregation of the data, or the like).

Figure 6A:
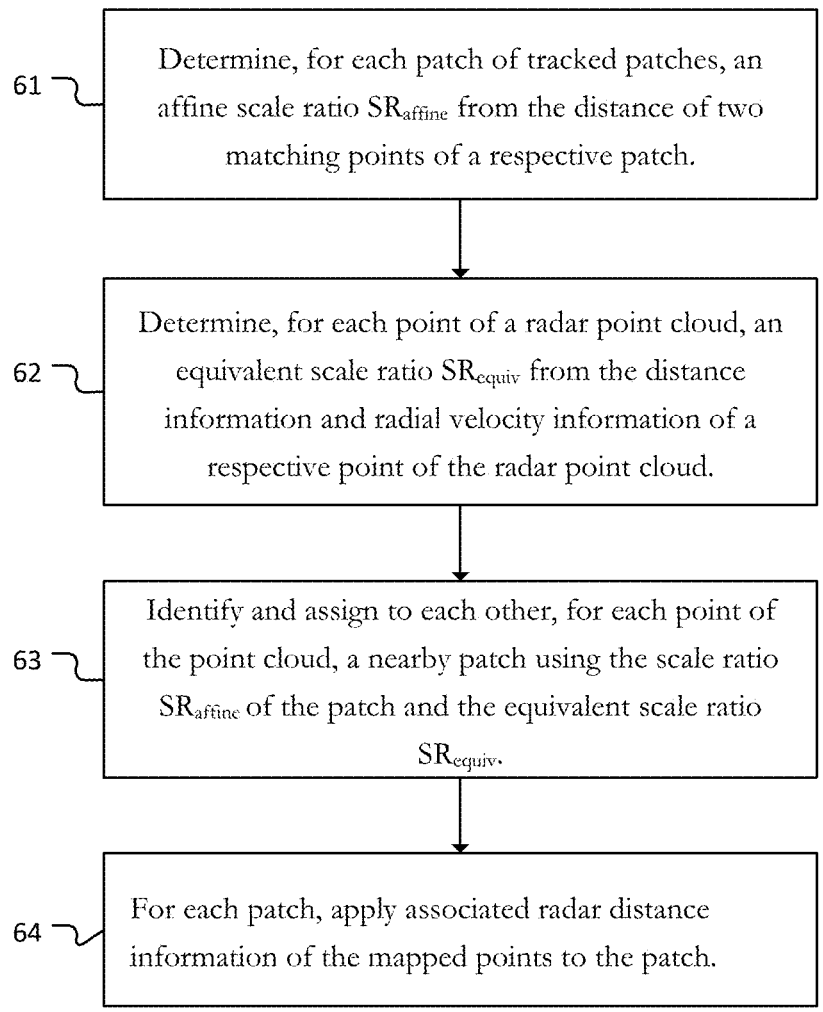
FIG. 6a schematically shows a process of camera-radar fusion using affine correspondences.

FIG. 6a schematically shows a process of camera-radar fusion using affine correspondences. The process may for example be operated by a control unit (7600 in FIG. 9) of a vehicle control system (7000 in FIG. 9). At 61, it is determined, for each patch of the tracked patches (56 in FIG. 5), a patch scale ratio from the distance of two matching points of a respective patch. This process is described in more detail above with regard to FIG. 3 and Eq. (1). At 62, it is determined, for each point of a radar point cloud, an equivalent scale ratio from the distance information and radial velocity information of a respective point of the radar point cloud. This process is described in more detail above with regard to Eq. (3). At 63, for each point of the point cloud, a nearby patch is identified using the patch scale ratio and the equivalent scale ratio. The point and the nearby patch witch matching scale ratio are assigned to each other. At 64, for each patch, the associated radar information (e.g. distance and velocity) of the mapped points is applied to the patch.

Figure 6B:
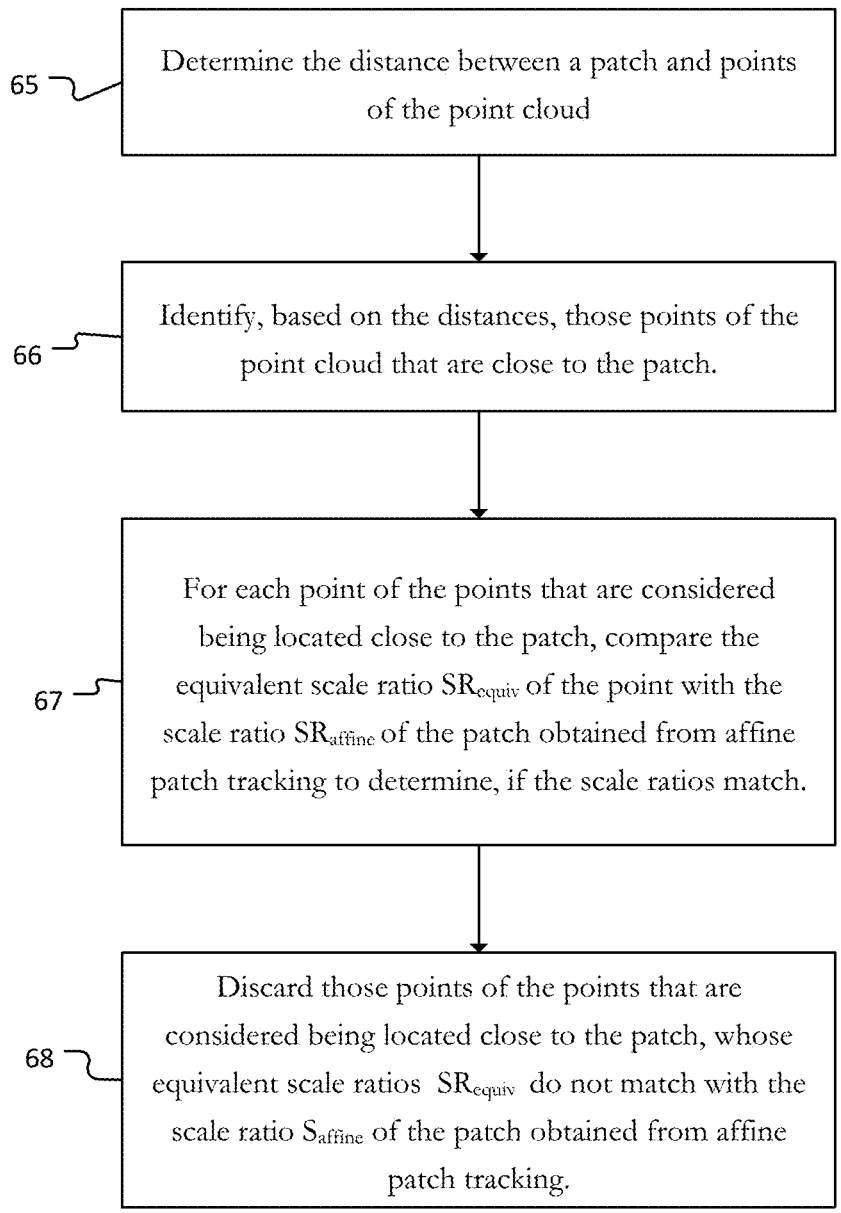
FIG. 6b shows an example of how to identify, for each point of the point cloud, a nearby patch is using the patch scale ratio and the equivalent scale ratio.

FIG. 6b shows an example of how to identify, for each point of the point cloud, a nearby patch is using the patch scale ratio and the equivalent scale ratio. At 65, the distance between a patch and points of the point cloud is determined. At 66, based on the distances obtained at 65, those points of the point cloud are identified that are close to the patch. At 67, for each point of the points that are considered as being located close to the patch, a comparison of the equivalent scale ratio of the point with the scale ratio of the patch obtained from affine patch tracking is performed to determine, if the scale ratios match. At 68, those points, whose equivalent scale ratios do not match with the scale ratio of the patch obtained from affine patch tracking, are discarded.

Determining, at 65, the distance between a patch and a point of the point cloud may for example be achieved by determining a patch position by averaging the world coordinates of all points defining the patch and determining the distance between the patch position and the world coordinate of the point of the point cloud.

Identifying, at 66, based on the distances obtained at 65, those points of the point cloud that are close to the patch may for example achieved by comparing the distances obtained at 65 with a predefined threshold value and considering those points as close to the patch whose distance to the patch is below the threshold value.

Performing, at 67, for each point of the points that are considered as being located close to the patch, a comparison of the equivalent scale ratio of the point with the scale ratio of the patch obtained from affine patch tracking may for example be achieved by subtracting the scale ratios to determine a scale ratio difference, and comparing the absolute value of the scale ratio difference with a predefined threshold value.

With the concept as described in the embodiments, it is not necessary to convert data from one sensor to the domain of the other and find correspondences between the data.

Besides a robust way of tracking features in an image sequence, they provide additional information on the features such as their scale ratio. For example, tracking sparse features over time in an image sequence is a frequently used technique in computer vision in general.

Radar does give a measurement on the absolute distance, and on the radial velocity. From these two quantities we can compute an implied scale ratio, since knowing radial distance and velocity, we can estimate e.g. the time to contact and from this the scale ratio. This gives us a common domain for radar and camera, which we can use for relating tracked affine correspondences to radar measurements, eliminating much of the ambiguities arising in the conversion between camera and radar domains.

The main advantage of the invention is that it resolves much of the domain ambiguity between camera and radar sensors. By that, it allows for more straightforward and precise fusion.

Furthermore, it can be integrated easily in existing vision-based systems based on affine correspondences. This integration comes at negligible extra computation time or memory requirements and is therefore well-suited for real-time capable systems.

Object Segmentation

Figure 7:
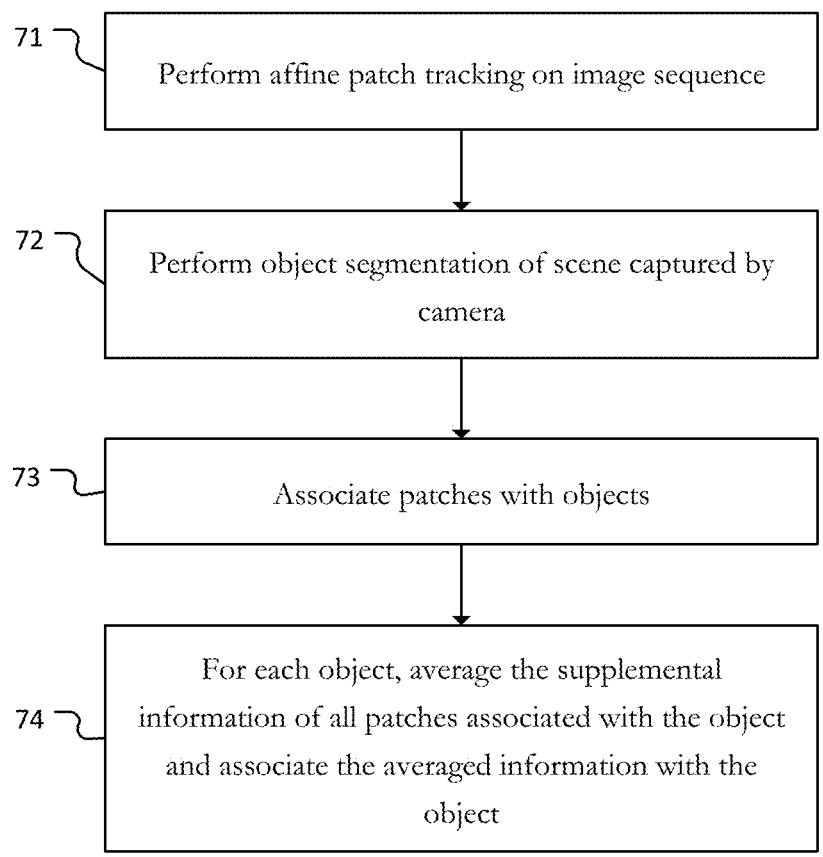
FIG. 7 schematically shows a process of using information from camera-radar fusion on an object.

FIG. 7 schematically shows a process of using information from camera-radar fusion on an object level. The process may for example be operated by a control unit (7600 in FIG. 9) of a vehicle control system (7000 in FIG. 9). At 71, affine patch tracking is performed on an image sequence obtained by a camera. At 72, it is performed an object segmentation of scene captured by camera. At 73, the patches obtained by affine patch tracking 71 are associated with objects obtained by object segmentation 72. At 74, for each object identified by object segmentation 72, the supplemental information of all patches associated with the object is average, and the averaged information is associated with the object.

Performing object segmentation of scene captured by camera, at 72, may for example be achieved by any techniques known to the skilled person, for example the technique presented by Di Feng et al in "Deep Multi-modal Object Detection and Semantic Segmentation for Autonomous Driving: Datasets, Methods, and Challenges", arXiv: 1902.07830.

Associating, at 73, the patches obtained by affine patch tracking with objects obtained by object segmentation may for example be achieved by finding, for each patch, a corresponding object that is close to the patch.

Averaging, at 74 the supplemental information of all patches associated with the object may for example comprise averaging distance and radial speed information obtained from radar over all patches that are related to an object. Also, other information obtained from the radar domain, such as Time to Collision (TTC) may be averaged over patches and attributed to an object at the object level.

Performance of Camera-Radar Fusion

FIG. 8*a* provides a table in which the performance of a camera is compared to the performance of radar. For angular position, the performance of a camera is very good, the performance of radar is, however, not so good. For radial distance, the performance of a camera is not so good, the performance of radar is, however, good. For radial speed, a camera provides no information, the performance of radar is, however, very good.

FIG. 8*b* provides a table in which the performance of a camera that exploits affine correspondences is compared to the performance of radar. For angular position, the performance of a camera with affine correspondences is very good, the performance of radar is, however, not so good. For radial distance, the performance of a camera with affine correspondences is not so good, the performance of radar is, however, good. For radial speed, a camera with affine correspondences provides no information, the performance of radar is, however, very good. A camera with affine correspondences provides a good performance in determining a scale ratio (SR) and a Time to Contact (TTC). This information is also implicitly contained in radar data. A camera with affine correspondences provides a good performance in determining a surface normal. However, radar does not provide any information on surface normals.

Implementation

The technology according to an embodiment of the present disclosure is applicable to various products. The techniques of the embodiments may for example be used for driving assistance systems. For example, the technology according to an embodiment of the present disclosure may be implemented as a device included in a mobile body that is any of kinds of automobiles, electric vehicles, hybrid electric vehicles, motorcycles, bicycles, personal mobility vehicles, airplanes, drones, ships, robots, construction machinery, agricultural machinery (tractors), and the like.

Figure 9:
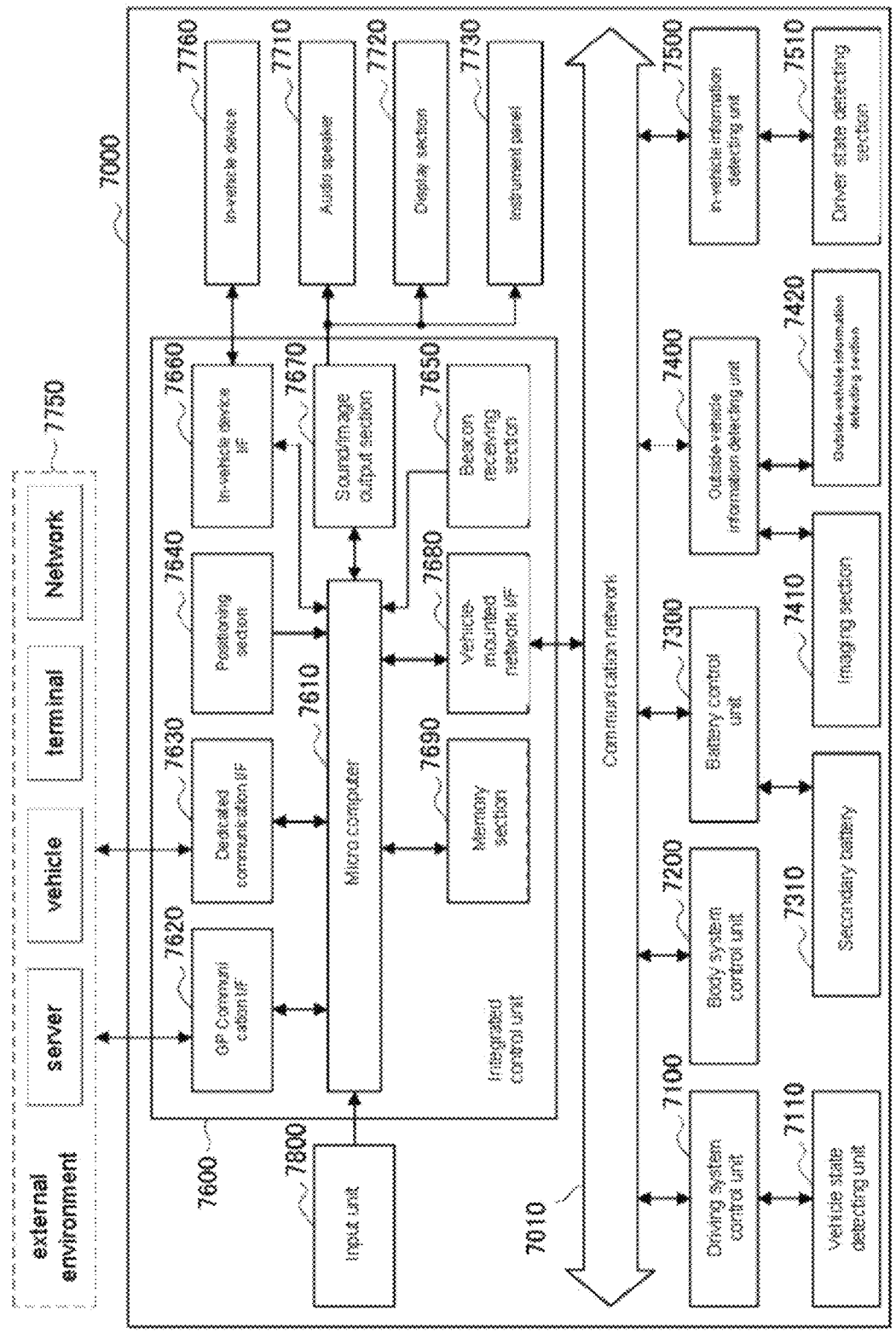
FIG. 9 is a block diagram depicting an example of schematic configuration of a vehicle control system.

FIG. 9 is a block diagram depicting an example of schematic configuration of a vehicle control system 7000 as an example of a mobile body control system to which the technology according to an embodiments of the present disclosure can be applied. The vehicle control system 7000 includes a plurality of electronic control units connected to each other via a communication network 7010. In the example depicted in FIG. 9, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 9 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 10:
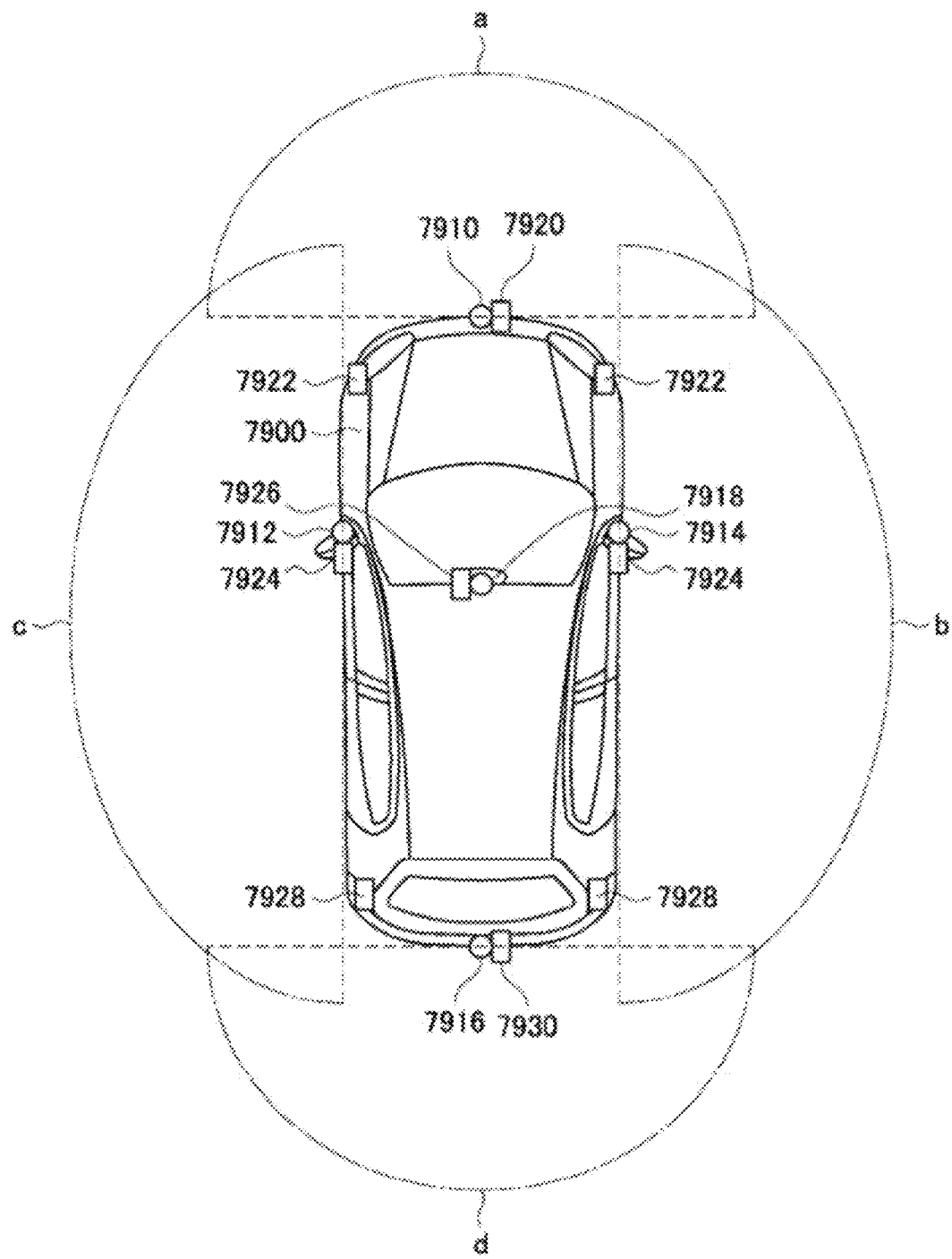
FIG. 10 is a diagram of assistance in explaining an example of installation positions of an outside-vehicle information detecting section and an imaging section.

FIG. 10 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 10 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 9, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 9, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 9 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for realizing the functions of affine patch tracking (55 in FIG. 5) and sensor fusion (e.g. Camera-Radar fusion 57 in FIG. 5) can be implemented in one of the control units or the like. In addition, a computer readable recording medium storing such a computer program can also be provided. The recording medium is, for example, a magnetic disk, an optical disk, a magneto-optical disk, a flash memory, or the like. In addition, the above-described computer program may be distributed via a network, for example, without the recording medium being used.

In the vehicle control system 7000 described above, the functions of affine patch tracking (55 in FIG. 5) and sensor fusion (e.g. Camera-Radar fusion 57 in FIG. 5) according to the embodiments described above can be applied to the integrated control unit 7600 in the application example depicted in FIG. 9.

It should be noted that the description above is only an example configuration. Alternative configurations may be implemented with additional or other units, sensors, or the like.

It should also be noted that the division of the systems of FIGS. 5 and 9 into units is only made for illustration purposes and that the present disclosure is not limited to any specific division of functions in specific units.

It should also be recognized that the embodiments describe methods with an exemplary ordering of method steps. The specific ordering of method steps is, however, given for illustrative purposes only and should not be construed as binding.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) A method of performing sensor fusion of data obtained from a camera and a supplemental sensor, the method comprising performing patch tracking on image data provided by the camera to determine tracked patches, and performing a fusion of the image data obtained from the camera with supplemental data provided by the supplemental sensor based on the tracked patches.

(2) The method of (1), wherein performing patch tracking comprises performing an affine patch tracking.

(3) The method of (1) or (2), comprising determining, for a patch of the tracked patches, a patch scale ratio.

(4) The method of any one of (1) to (3), comprising determining, for a part of the supplemental data provided by the supplemental sensor, an equivalent scale ratio.

(5) The method of any one of (1) to (4), comprising identifying, for a part of the supplemental data provided by the supplemental sensor, a corresponding patch using a scale ratio of the patch and an equivalent scale ratio related to the supplemental data provided by the supplemental sensor.

(6) The method of any one of (1) to (5), comprising applying part of the supplemental data provided by the supplemental sensor to a patch of the tracked patches.

(7) The method of any one of (1) to (6), wherein the supplemental data is provided by the supplemental sensor in the form of a point cloud.

(8) The method of any one of (4) to (7), wherein the part of the supplemental data is a point of a point cloud.

(9) The method of any one of (1) to (8), wherein the supplemental sensor is a radar sensor.

(10) The method of any one of (4) to (9), wherein the equivalent scale ratio is determined from distance information and radial velocity information of a point of the radar point cloud.

(11) The method of any one of (1) to (10), comprising, for a point that is considered being located close to a patch of the tracked patches, comparing an equivalent scale ratio of the point with a scale ratio of the patch obtained from patch tracking to determine, if the scale ratios match.

(12) The method of any one of (1) to (11), comprising discarding those points of points that are considered being located close to a patch of the tracked patches, whose equivalent scale ratios do not match with a scale ratio of the patch obtained from affine patch tracking.

(13) The method of any one of (1) to (12), comprising performing object segmentation on the image data captured by the camera.

(14) The method of any one of (1) to (13), comprising averaging supplemental data related to patches associated with an object, and associating the averaged information with the object.

(15) The method of any one of (1) to (14), wherein the supplemental data comprises Time to Collision information.

(16) The method of any one of (1) to (15), wherein the sensor fusion is applied in an automotive context.

(17) A device comprising circuitry, the circuitry being configured to execute instructions, the instructions, when executed on the circuitry, performing
patch tracking on image data provided by a camera to determine tracked patches, and a fusion of the image data obtained from the camera with supplemental data provided by a supplemental sensor based on the tracked patches.

(18) A system comprising a camera, a supplemental sensor, and the device of (17), the device being configured to perform patch tracking on image data provided by the camera to determine tracked patches, and to perform a fusion of the image data obtained from the camera with supplemental data provided by the supplemental sensor based on the tracked patches.

The invention claimed is:

1. A method of performing sensor fusion of data obtained from a camera and a supplemental sensor, the method comprising:
performing patch tracking on image data provided by the camera to determine tracked patches;
determining, for each tracked patch, a patch scale ratio based on a change in size of the patch between two frames of the image data by calculating a determinant of a 2×2 upper left sub-matrix of an affine transformation matrix representing the change in the patch between the two frames;
determining, for each part of supplemental data provided by the supplemental sensor, an equivalent scale ratio based on a ratio of distances to an object at two different times, wherein the ratio is calculated using a radial velocity measurement and a current distance measurement;
identifying, for each part of the supplemental data, a corresponding tracked patch by matching the equivalent scale ratio of the part of supplemental data to the patch scale ratio of the tracked patch; and
performing a fusion of the image data obtained from the camera with supplemental data provided by the supplemental sensor based on the tracked patches.

2. The method of claim 1, wherein performing patch tracking comprises performing an affine patch tracking.

3. The method of claim 1, comprising applying part of the supplemental data provided by the supplemental sensor to a patch of the tracked patches.

4. The method of claim 1, wherein the supplemental data is provided by the supplemental sensor in the form of a point cloud.

5. The method of claim 1, wherein the part of the supplemental data is a point of a point cloud.

6. The method of claim 1, wherein the supplemental sensor is a radar sensor.

7. The method of claim 1, wherein the equivalent scale ratio is determined from distance information and radial velocity information of a point of the radar point cloud.

8. The method of claim 1, comprising, for a point that is considered being located close to a patch of the tracked patches, comparing an equivalent scale ratio of the point with a scale ratio of the patch obtained from patch tracking to determine if the scale ratios match.

9. The method of claim 1, comprising discarding those points of points that are considered being located close to a patch of the tracked patches, whose equivalent scale ratios do not match with a scale ratio of the patch obtained from affine patch tracking.

10. The method of claim 1, comprising performing object segmentation on the image data captured by the camera.

11. The method of claim 1, comprising averaging supplemental data related to patches associated with an object, and associating the averaged information with the object.

12. The method of claim 1, wherein the supplemental data comprises Time to Collision information.

13. The method of claim 1, wherein the sensor fusion is applied in an automotive context.

14. A device, comprising:
processing circuitry, the processing circuitry being configured to
perform patch tracking on image data provided by a camera to determine tracked patches,
determine, for each tracked patch, a patch scale ratio based on a change in size of the patch between two frames of the image data by calculating a determinant of a 2×2 upper left sub-matrix of an affine transformation matrix representing the change in the patch between the two frames,
determine, for each part of supplemental data provided by the supplemental sensor, an equivalent scale ratio based on a ratio of distances to an object at two different times, wherein the ratio is calculated using a radial velocity measurement and a current distance measurement,
identify, for each part of the supplemental data, a corresponding tracked patch by matching the equivalent scale ratio of the part of supplemental data to the patch scale ratio of the tracked patch, and
perform a fusion of the image data obtained from the camera with supplemental data provided by a supplemental sensor based on the tracked patches.

15. A system comprising a camera, a supplemental sensor, and the device of claim 14, the device being configured to perform patch tracking on image data provided by the camera to determine tracked patches, and to perform a fusion of the image data obtained from the camera with supplemental data provided by the supplemental sensor based on the tracked patches.

* * * * *